(12) United States Patent
Barrientos Blanco

(10) Patent No.: US 12,384,241 B2
(45) Date of Patent: Aug. 12, 2025

(54) DIFFERENTIAL GEAR ARRANGEMENT

(71) Applicants: Ningbo Geely Automobile Research & Development Co., Ltd., Ningbo (CN); Zhejiang Geely Holding Group Co., Ltd., Zhejiang (CN)

(72) Inventor: Eva Barrientos Blanco, Gothenburg (SE)

(73) Assignees: Ningbo Geely Automobile Research & Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 18/893,035

(22) Filed: Sep. 23, 2024

(65) Prior Publication Data
US 2025/0010706 A1    Jan. 9, 2025

Related U.S. Application Data

(63) Continuation of application No. PCT/CN2023/085134, filed on Mar. 30, 2023.

(30) Foreign Application Priority Data

Apr. 19, 2022    (EP) .................................... 22168916

(51) Int. Cl.
*F16H 48/40*    (2012.01)
*B60K 17/16*    (2006.01)
(Continued)

(52) U.S. Cl.
CPC .............. *B60K 17/16* (2013.01); *B60K 23/08* (2013.01); *B60K 2001/001* (2013.01);
(Continued)

(58) Field of Classification Search
CPC .. B60K 17/16; B60K 23/08; B60K 2001/001; F16H 48/00; F16H 48/20; F16H 48/30; F16H 48/38; F16H 48/40; F16H 2048/085
See application file for complete search history.

(56) References Cited

U.S. PATENT DOCUMENTS

| 10,245,950 | B2 | 4/2019 | Shimizu et al. |
| 11,034,232 | B2 | 6/2021 | Nilsson |
| 2018/0154772 | A1 | 6/2018 | Blair et al. |

FOREIGN PATENT DOCUMENTS

| FR | 2491010 A1 | 4/1982 | |
| GB | 2490427 A | * 10/2012 | ........... B60K 17/344 |

(Continued)

OTHER PUBLICATIONS

International Search Report and Written Opinion from corresponding International Application No. PCT/CN2023/085134, mailed on Jul. 12, 2023, 14 pages.

*Primary Examiner* — Justin Holmes
(74) *Attorney, Agent, or Firm* — Tucker Ellis LLP

(57) ABSTRACT

A differential gear arrangement for a vehicle. The differential gear arrangement includes a ring gear, a spindle gear, a spindle gear carrier, a side gear and an output shaft. The spindle gear is carried by the spindle gear carrier and rotatable relative to the spindle gear carrier. The spindle gear and the side gear are engaged with each other. The side gear is rotationally connected to the output shaft. The ring gear is arranged to drive the output shaft by rotating the spindle gear carrier when the ring gear and the spindle gear carrier are rotationally connected to each other. The ring gear and the spindle gear carrier are rotationally disconnectable from each other by axial displacement of the spindle gear carrier relative to the ring gear and the output shaft.

14 Claims, 6 Drawing Sheets

(51) Int. Cl.
*B60K 23/08* (2006.01)
*B60K 1/00* (2006.01)
*F16H 48/00* (2012.01)
*F16H 48/08* (2006.01)
*F16H 48/20* (2012.01)
*F16H 48/30* (2012.01)
*F16H 48/38* (2012.01)

(52) U.S. Cl.
CPC ........ *F16H 48/00* (2013.01); *F16H 2048/085* (2013.01); *F16H 48/20* (2013.01); *F16H 48/30* (2013.01); *F16H 48/38* (2013.01); *F16H 48/40* (2013.01)

(56) References Cited

FOREIGN PATENT DOCUMENTS

JP         H09269043 A  *  10/1997
WO     WO-2010017881 A1 *  2/2010  .......... B60K 17/348

* cited by examiner

DIFFERENTIAL GEAR ARRANGEMENT

RELATED APPLICATION DATA

This application is a continuation of International Patent Application No. PCT/CN2023/085134, filed Mar. 30, 2023, and claims the benefit of European Patent Application No. 22168916.9, filed Apr. 19, 2022, the disclosures of which are incorporated herein by reference in their entireties.

TECHNICAL FIELD

The invention relates to a differential gear arrangement for a vehicle.

BACKGROUND

Today's transmissions for vehicles often have an all-wheel drive function. Such AWD (All Wheel Drive) vehicles provide high power but have also high fuel consumption. In order to reduce the fuel consumption when AWD is not needed, disconnecting systems of the transmission are used. To reduce losses in an effective way, a disconnecting device needs to disconnect the wheels from the transmission at a position close to the wheels, and for that reason one way is to use a disconnecting device arranged between the differential and the respective wheel.

Such a solution can reduce the drag on the vehicle and the energy consumption, but will also lead to an increased number of components, higher complexity, and less space for the differential.

SUMMARY

An objective of the invention is to provide a differential gear arrangement for a vehicle which differential gear arrangement enables wheels of the vehicle to be disconnected from the transmission of the vehicle.

The objective is achieved by a differential gear arrangement for a vehicle, wherein the differential arrangement comprises a ring gear, a spindle gear, a spindle gear carrier, a side gear and an output shaft, and the spindle gear is carried by the spindle gear carrier and rotatable relative to the spindle gear carrier, and the spindle gear and the side gear are engaged with each other, and the side gear is rotationally connected to the output shaft, and the ring gear is arranged to drive the output shaft by rotating the spindle gear carrier when the ring gear and the spindle gear carrier are rotationally connected to each other, and wherein the ring gear and the spindle gear carrier are rotationally disconnectable from each other by axial displacement of the spindle gear carrier relative to the ring gear and the output shaft.

The invention is based on the insight that by such a differential gear arrangement, disconnection between the transmission and the current wheels of a vehicle can be performed without using separate disconnecting devices. This may enable a more compact design and a reduced number of components.

The ring gear and the spindle gear carrier are preferably rotationally connectable to each other and rotationally disconnectable from each other by means of a dog clutch, though other solutions are also possible, such as use of a magnetic clutch for rotationally connecting and disconnecting the ring gear and the spindle gear carrier to/from each other.

The spindle gear carrier can be displaced by a shifting fork driven by a motor or solenoid or a linear motor directly connected to the spindle gear carrier. Alternatively, the shifting fork or the linear motor can be arranged to displace another component axially locked to the spindle gear carrier.

According to one embodiment of the differential gear arrangement, the ring gear is supported by the output shaft, and journaled by a bearing relative to the output shaft for mutual rotation between the ring gear and the output shaft. Hereby, a compact design where the ring gear and the spindle gear carrier are arranged close to each other may be achieved.

According to a further embodiment of the differential gear arrangement, the side gear is arranged on a shaft extension which is rotationally connected to the output shaft and axially displaceable relative to the output shaft by splines. Hereby, power can be transferred and the spindle gear carrier can be displaced.

According to a further embodiment of the differential gear arrangement, an end part of the output shaft is hollow and the side gear shaft extension is arranged inside the output shaft. Hereby, a space-saving connection between the output shaft and the side gear shaft extension can be achieved.

According to a further embodiment of the differential gear arrangement, the side gear is locked against axial displacement relative to the spindle gear carrier. Hereby, the side gear and the spindle gear carrier will move together when the spindle gear carrier or the side gear is displaced.

According to a further embodiment of the differential gear arrangement, the spindle gear carrier constitutes a housing enclosing the spindle gear and the side gear. Hereby, the spindle gear and the side gear are protected.

According to a further embodiment, the differential gear arrangement comprises a further side gear rotationally connected to a further output shaft, wherein the spindle gear and the further side gear are engaged with each other, and the side gear and the further side gear are arranged opposite to each other, and the spindle gear carrier is axially displaceable relative to the further output shaft, and wherein the output shaft and the further output shaft constitute two half shafts of a wheel axle. Hereby, a left wheel and a right wheel of a wheel axle may be disconnected from a transmission by displacement of the spindle gear carrier.

According to a further embodiment, the differential gear arrangement comprises a ring gear carrier, wherein the ring gear and the ring gear carrier are attached to each other, and preferably the ring gear carrier and the spindle gear carrier are rotationally connectable and disconnectable relative to each other. Hereby, the ring gear can be supported by the ring gear carrier and the connection to the spindle gear carrier can be performed via the ring gear carrier with increased freedom to select the connection position.

According to a further embodiment of the differential gear arrangement, the ring gear carrier is supported by the further output shaft, and journaled by a bearing relative to the further output shaft for mutual rotation between the ring gear carrier and the further output shaft. Hereby, improved strength and stability can be achieved.

According to a further embodiment, the differential gear arrangement comprises a further spindle gear, wherein the further spindle gear is carried by the spindle gear carrier and rotatable relative to the spindle gear carrier, and the further spindle gear and the side gear are engaged with each other. Hereby, increased power can be transferred by the differential gear arrangement.

According to a further aspect, the invention relates to a vehicle transmission comprising a differential gear arrangement, and to a vehicle having an all-wheel drive function (AWD), which vehicle comprises a wheel axle provided with a differential gear arrangement as described herein. The advantages of the vehicle transmission and the vehicle are substantially the same as the advantages already discussed hereinabove with reference to the different embodiments of the differential gear arrangement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS

Figure 1:
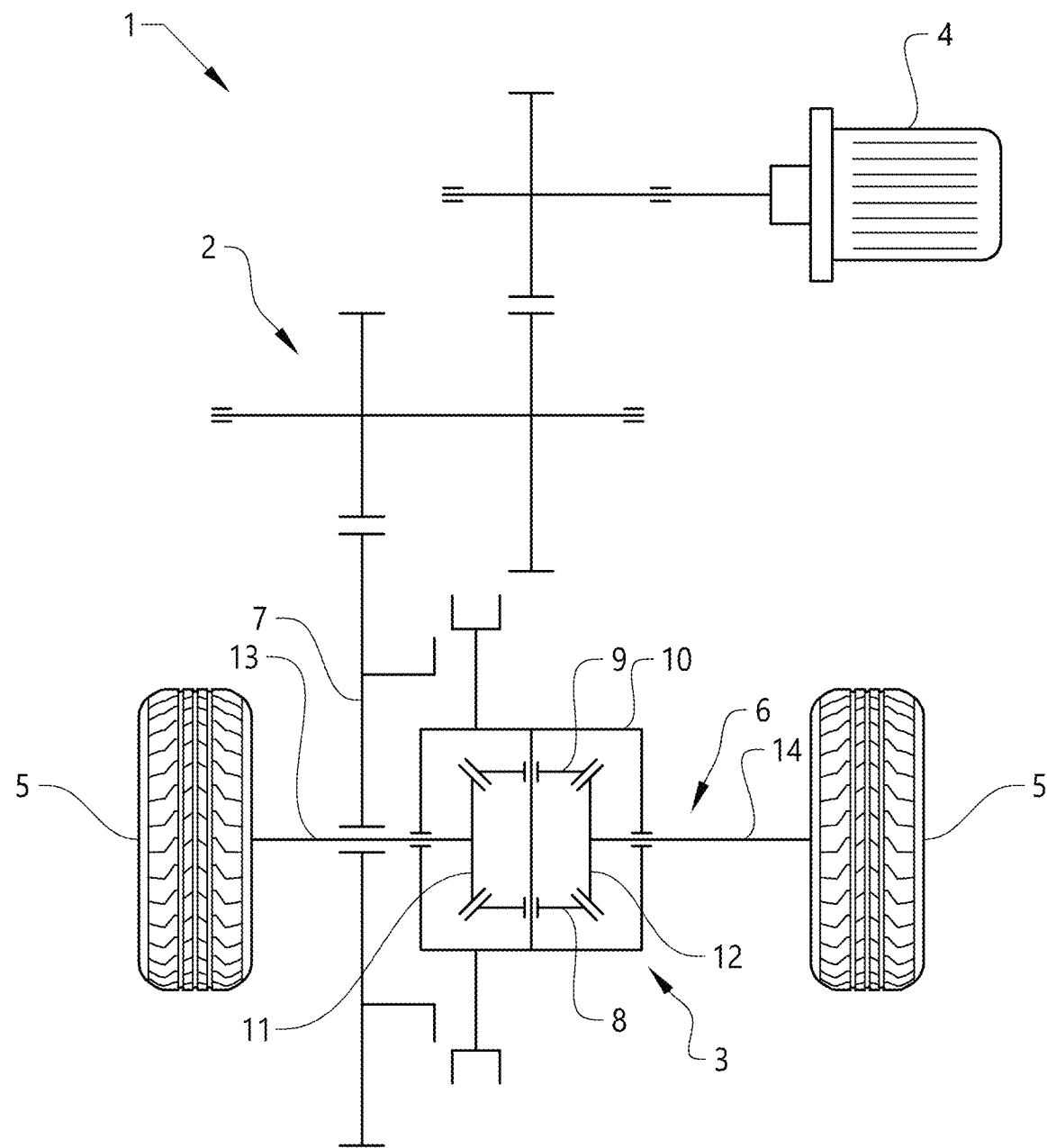
FIG. 1 is a schematic view of a vehicle transmission comprising a differential gear arrangement according to the invention.

FIG. 1 is a schematic view of a vehicle transmission 1. The transmission 1 comprises a gearbox 2 and a differential gear arrangement 3. Power can be transferred from an electric motor 4 to wheels 5 of a vehicle wheel axle 6 by means of the transmission 1.

As appears from FIG. 1, the differential gear arrangement 3 comprises a ring gear 7, a (lower) spindle gear 8 and a further (upper) spindle gear 9, a spindle gear carrier 10, a (left) side gear 11 and a further (right) side gear 12, and a (left) output shaft 13 and a further (right) output shaft 14. The spindle gears 8, 9 are carried by the spindle gear carrier 10 and are rotatable relative to the spindle gear carrier 10. Each spindle gear 8, 9 is engaged with the left side gear 11 as well as the right side gear 12. The left side gear 11 and the right side gear 12 are arranged opposite to each other and rotationally connected to the left output shaft 13 and the right output shaft 14, respectively, for transferring power to the wheels 5. The spindle gear carrier 10 suitably constitutes a housing enclosing the spindle gears 8, 9 and the side gears 11, 12.

The ring gear 7 driven by the electric motor 4 via the gear box 2 is arranged to drive the left output shaft 13 and the right output shaft 14 by rotating the spindle gear carrier 10 when the ring gear 7 and the spindle gear carrier 10 are rotationally connected to each other.

Figure 2A:
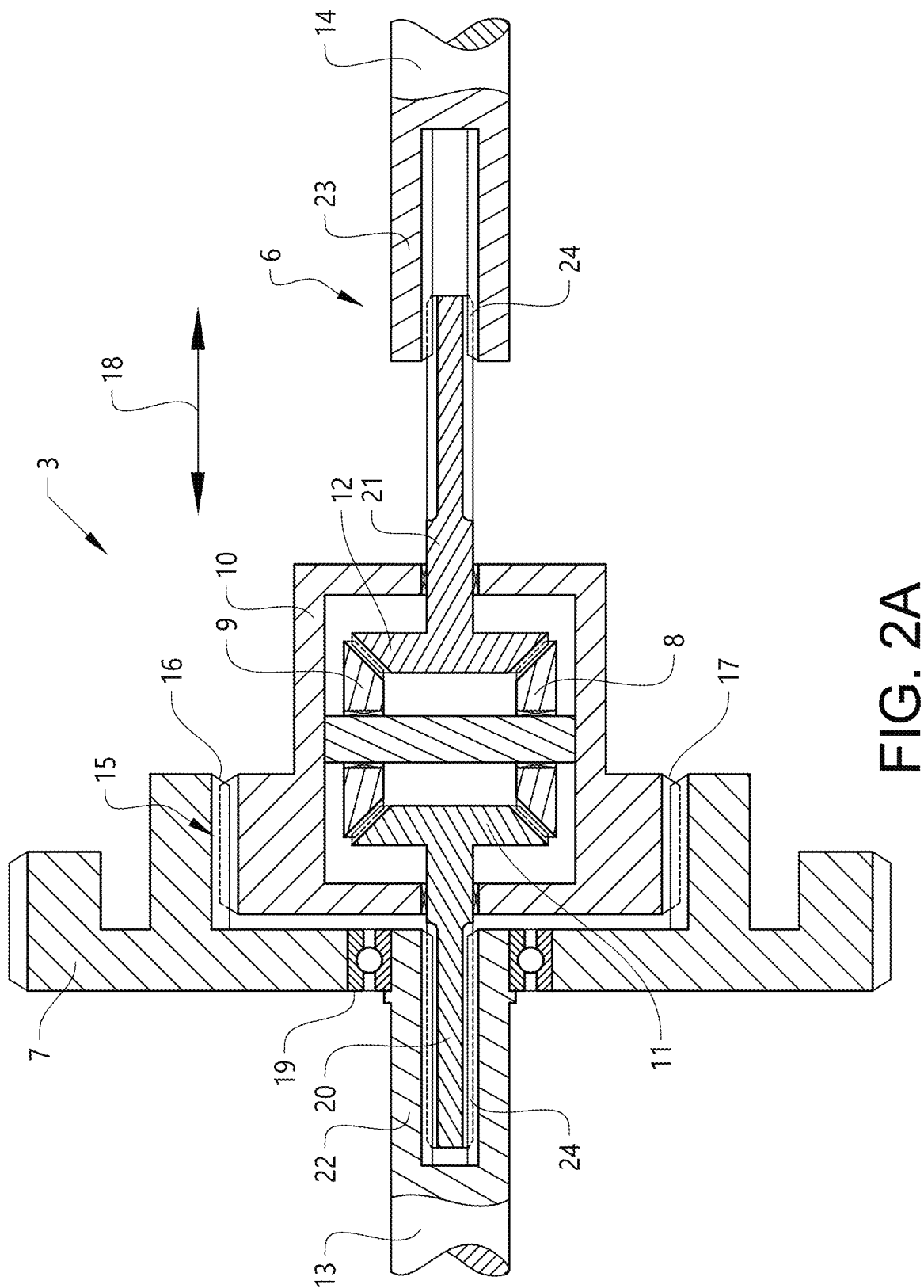
FIG. 2A is an enlarged view of the differential gear arrangement in FIG. 1 when the ring gear and the spindle gear carrier are connected to each other.
Figure 2B:
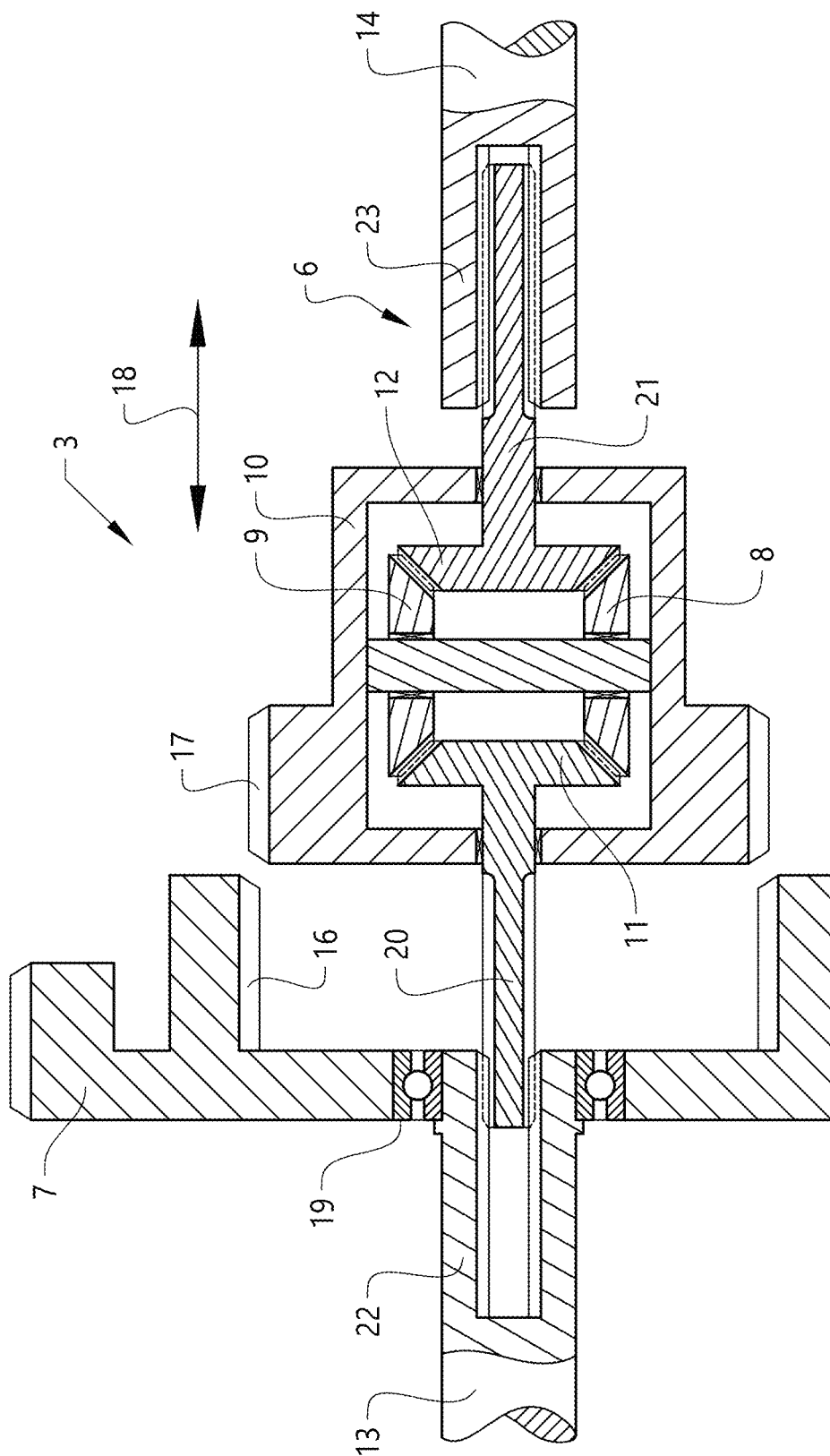
FIG. 2B is an enlarged view of the differential gear arrangement in FIG. 1 when the ring gear and the spindle gear carrier are disconnected from each other.

FIGS. 2A and 2B are enlarged views of the differential gear arrangement 3 in FIG. 1.

In the example embodiment illustrated in FIGS. 2A and 2B, the ring gear 7 and the spindle gear carrier 10 are rotationally connectable to each other and rotationally disconnectable from each other by means of a dog clutch 15.

Thus, the ring gear 7 has a set of dog clutch teeth 16 and the spindle gear carrier 10 has a set of dog clutch teeth 17 which sets of teeth 16, 17 are engaged with each other in FIG. 2A for transferring power.

This state when the ring gear 7 and the spindle gear carrier 10 are rotationally connected to each other, may represent a state where an all-wheel drive function of a vehicle is used. Both the left output shaft 13 and the right output shaft 14, which constitute so called half shafts of the vehicle wheel axle 6, are driven. In addition, a primary wheel axle (not shown) of the vehicle can be driven as well.

As appears from FIG. 2B, the ring gear 7 and the spindle gear carrier 10 are rotationally disconnectable from each other by axial displacement of the spindle gear carrier 10 relative to the ring gear 7 and relative to the left output shaft 13 and the right output shaft 14. In FIG. 2B, the spindle gear carrier 10 has been displaced to the right in an axial direction 18 as compared to the position of the spindle gear carrier 10 in FIG. 2A. This state when the ring gear 7 and the spindle gear carrier 10 are rotationally disconnected from each other, may represent a state where an all-wheel drive function of a vehicle is not used, i.e. is disconnected. Neither the left output shaft 13 nor the right output shaft 14 is driven.

Further with reference to FIGS. 2A and 2B, the ring gear 7 is supported by the left output shaft 13, and journaled by a bearing 19 relative to the left output shaft 13 for mutual rotation between the ring gear 7 and the left output shaft 13.

Each side gear 11, 12 is suitably arranged on a shaft extension 20, 21, which shaft extension is rotationally connected to the corresponding output shaft 13, 14 and axially displaceable relative to the output shaft 13, 14 by splines 24. For example, an end part 22, 23 of each output shaft 13, 14 arranged closest to the spindle gear carrier 10 is hollow and the side gear shaft extension 20, 21 is arranged inside the output shaft 13, 14.

Each side gear 11, 12 is locked against axial displacement relative to the spindle gear carrier 10, but can rotate relative to the spindle gear carrier 10. In other words; when the spindle gear carrier 10 is displaced in the axial direction 18 towards and from the ring gear 7, the left side gear 11 with the left side gear shaft extension 20 and the right side gear 12 with the right side gear shaft extension 21, as well as the spindle gears 8, 9, will follow the linear motion of the spindle gear carrier 10.

Figure 3A:
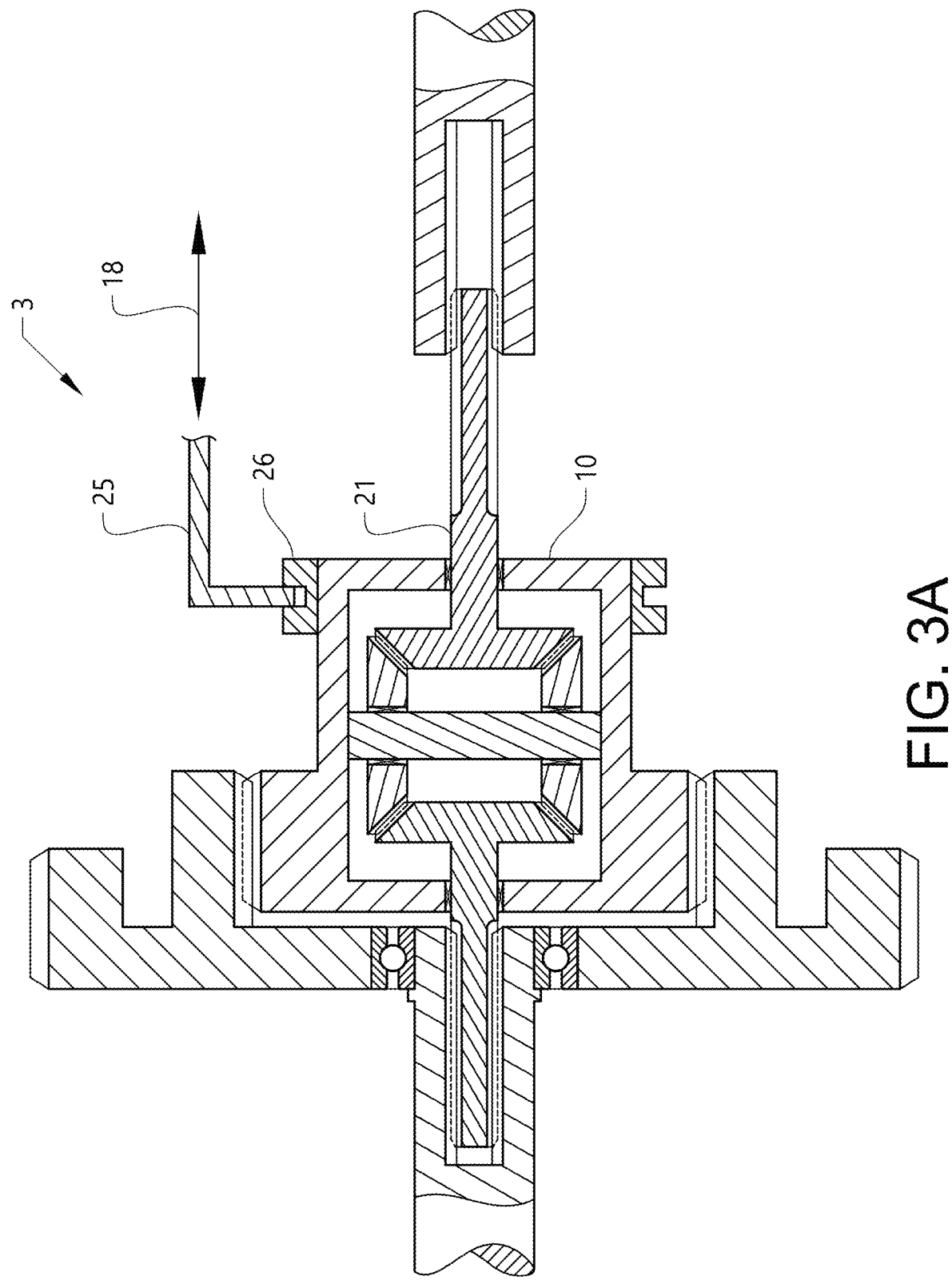
FIG. 3A shows the differential gear arrangement in FIG. 1 provided with a shifting fork.
Figure 3B:
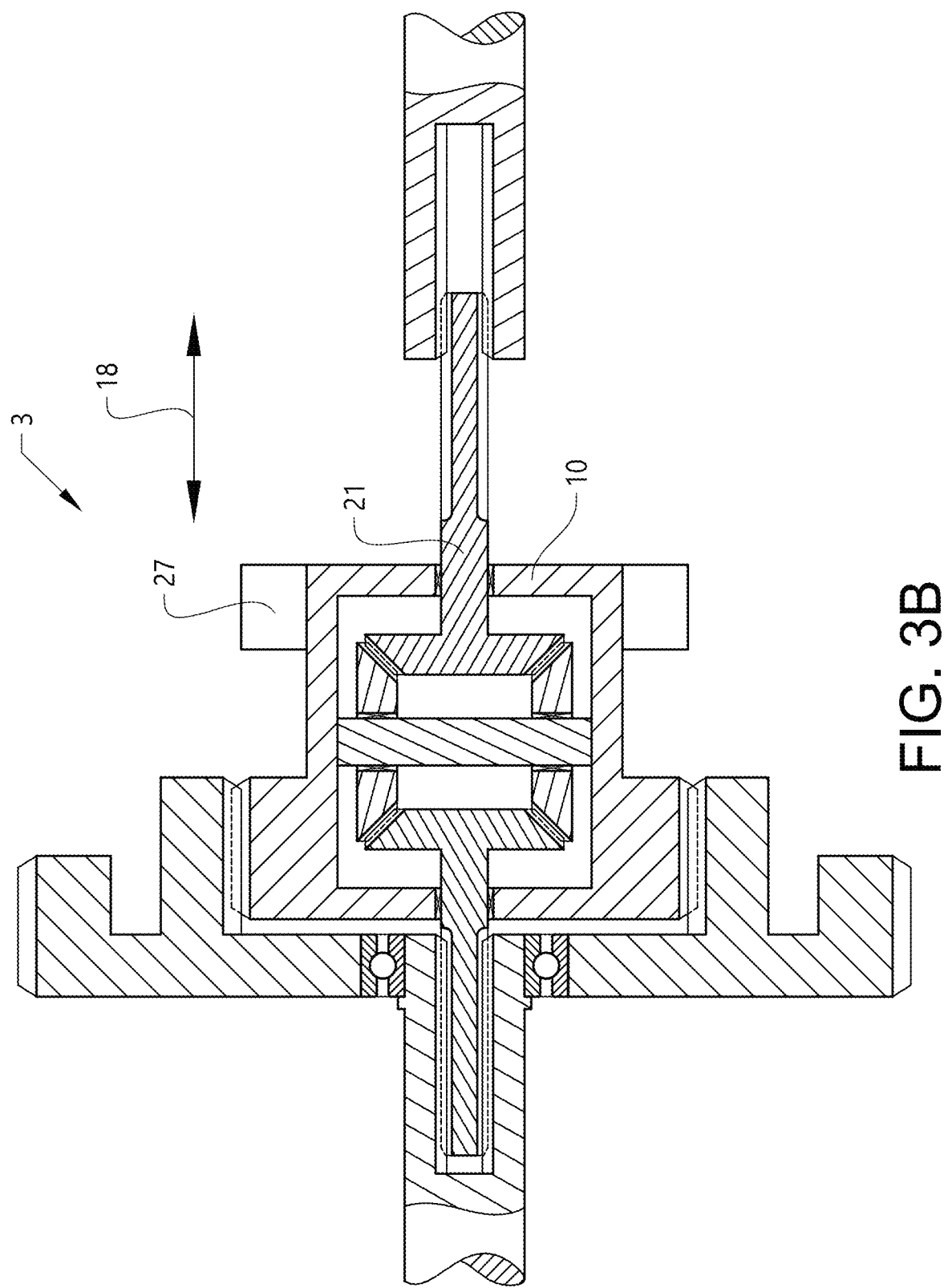
FIG. 3B shows the differential gear arrangement in FIG. 1 provided with a linear motor.

In FIGS. 3A and 3B some examples of actuation devices for controlling the differential gear arrangement 3 are schematically shown.

As appears from FIG. 3A, the spindle gear carrier 10 can be displaced by a shifting fork 25 that is moved in the axial direction 18. By means of the shifting fork 25, the connected state as illustrated in FIG. 2A and the disconnected state as illustrated in FIG. 2B of the differential gear arrangement 3, can be reached. The shifting fork 25 can be driven by a motor (not shown) or solenoid, for instance, which is attached to a housing of the differential gear arrangement 3. The shifting fork 25 is suitably engaged with a sleeve 26 allowing rotation of the sleeve 26 relative to the shifting fork 25. The sleeve 26 can be attached to the spindle gear carrier 10 or constitute a part of the spindle gear carrier 10. Optionally, instead the sleeve can be connected to another component or be part of this component, which component is axially locked to the spindle gear carrier 10, such as the right side gear shaft extension 21.

Alternatively, as appears from FIG. 3B, the spindle gear carrier 10 can be displaced by a linear motor 27, such as a stepping motor, which linear motor is directly connected to the spindle gear carrier 10. A stator part of the motor is attached to the housing of the differential gear arrangement 3. By means of the linear motor 27, the connected state as illustrated in FIG. 2A and the disconnected state as illustrated in FIG. 2B of the differential gear arrangement 3, can be reached. The linear motor 27 can be arranged to drive the spindle gear carrier 10 in the axial direction 18. Optionally, the linear motor can be arranged to drive another component axially locked to the spindle gear carrier 10, such as the right side gear shaft extension 21.

Figure 4:
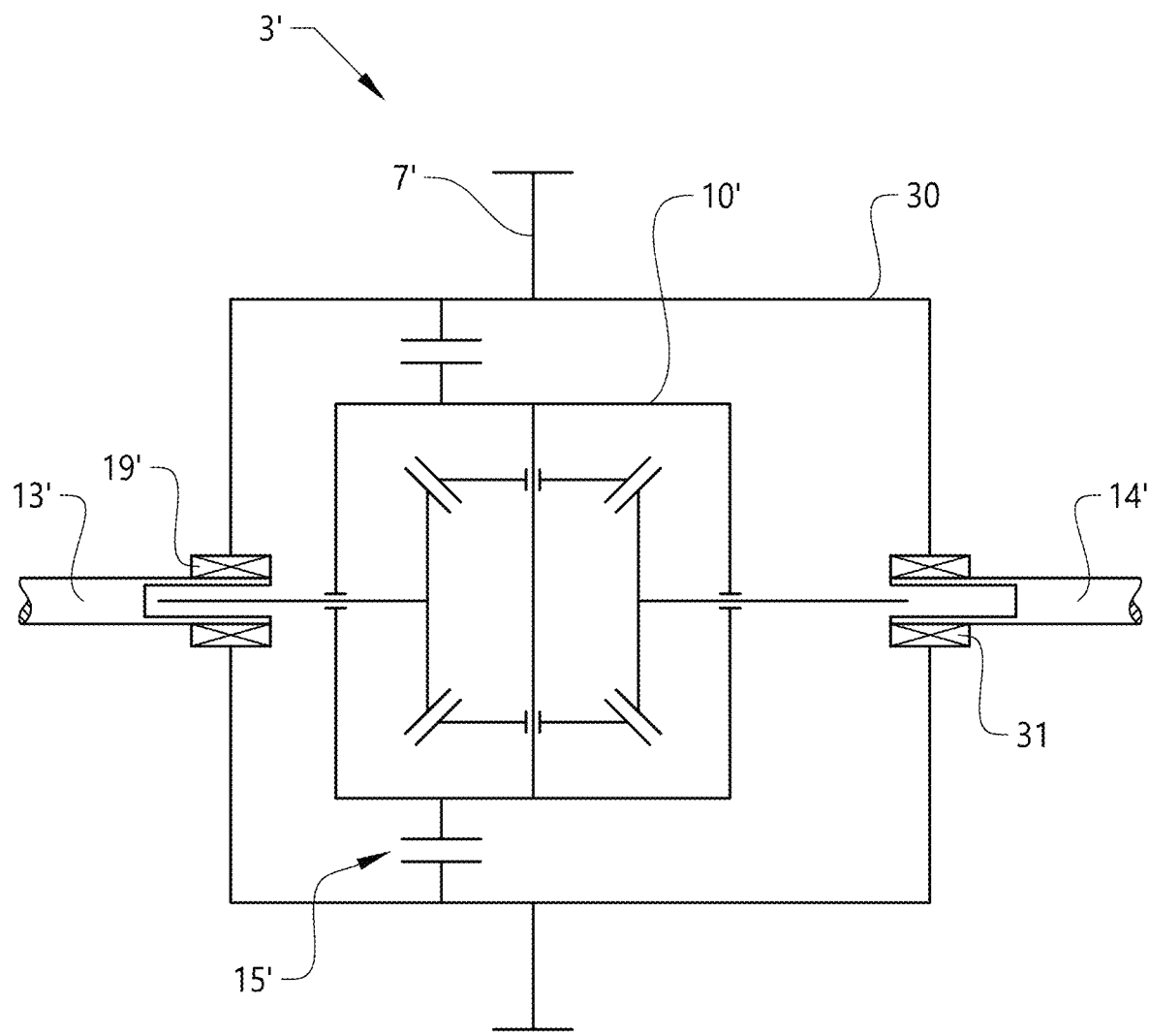
FIG. 4 is a schematic view of a variant of the differential gear arrangement.

FIG. 4 shows a variant of the differential gear arrangement 3'. In the following, primarily the features and components unique for this embodiment will be described. For same or corresponding components reference is made to the example embodiments described hereinabove. The differential gear arrangement 3' comprises a ring gear carrier 30. The ring gear 7' and the ring gear carrier 30 are attached to each other. The ring gear carrier 30 and the spindle gear carrier 10' are rotationally connectable and disconnectable relative to each other, for example by means of the dog clutch 15'. Thus, the ring gear 7' and the spindle gear carrier 10' can be rotationally connectable to each other and rotationally disconnectable from each other, either directly to each other or as illustrated in FIG. 4 via the ring gear carrier 30.

In the example embodiment illustrated in FIG. 4, the ring gear carrier 30 is supported by the further output shaft 14', i.e. the right output shaft, and journaled by a bearing 31 relative to the right output shaft 14' for mutual rotation between the ring gear carrier 30 (ring gear 7') and the right output shaft 14'. As previously described, the ring gear 7' or the ring gear carrier 30 can be supported by the left side output shaft 13', and journaled by a bearing 19' relative to the left output shaft 13 for mutual rotation between the ring gear carrier 30 (ring gear 7') and the left output shaft 13'.

It is to be understood that the present invention is not limited to the embodiments described above and illustrated in the drawings; rather, the skilled person will recognize that many changes and modifications may be made within the scope of the appended claims.

What is claimed is:

1. A differential gear arrangement for a vehicle, comprising a ring gear, a spindle gear, a spindle gear carrier, a side gear and an output shaft, the ring gear being supported on the output shaft by a bearing such that the ring gear can rotate relative to the output shaft, the spindle gear being carried by the spindle gear carrier and rotatable relative to the spindle gear carrier, the spindle gear and the side gear being engaged with each other, the side gear being rotationally connected to the output shaft, the ring gear being arranged to drive the output shaft by rotating the spindle gear carrier when the ring gear and the spindle gear carrier are rotationally connected to each other, wherein the ring gear and the spindle gear carrier are rotationally disconnectable from each other by axial displacement of the spindle gear carrier relative to the ring gear and the output shaft.

2. The differential gear arrangement according to claim 1, wherein the side gear is arranged on a shaft extension which is rotationally connected to the output shaft and axially displaceable relative to the output shaft by splines.

3. The differential gear arrangement according to claim 2, wherein an end part of the output shaft is hollow and the side gear shaft extension is arranged inside the output shaft.

4. The differential gear arrangement according to claim 1, wherein the side gear is locked against axial displacement relative to the spindle gear carrier.

5. The differential gear arrangement according to claim 1, wherein the ring gear and the spindle gear carrier are rotationally connectable to each other by a dog clutch.

6. The differential gear arrangement according to claim 1, wherein the spindle gear carrier constitutes a housing enclosing the spindle gear and the side gear.

7. The differential gear arrangement according to claim 1, wherein the differential gear arrangement comprises a further side gear rotationally connected to a further output shaft, the spindle gear and the further side gear being engaged with each other, the side gear and the further side gear being arranged opposite to each other, the spindle gear carrier being axially displaceable relative to the further output shaft, the output shaft and the further output shaft constituting two half shafts of a vehicle wheel axle.

8. The differential gear arrangement according to claim 1, wherein the differential gear arrangement comprises a ring gear carrier, and the ring gear and the ring gear carrier are attached to each other.

9. The differential gear arrangement according to claim 8, wherein the ring gear carrier and the spindle gear carrier are rotationally connectable and disconnectable relative to each other.

10. The differential gear arrangement according to claim 7, wherein the ring gear carrier is supported by the further output shaft, and journaled by a bearing relative to the further output shaft for mutual rotation between the ring gear carrier and the further output shaft.

11. The differential gear arrangement according to claim 1, wherein the differential gear arrangement comprises a further spindle gear, the further spindle gear being carried by the spindle gear carrier and rotatable relative to the spindle gear carrier, the further spindle gear and the side gear being engaged with each other.

12. The differential gear arrangement according to claim 1, wherein the spindle gear carrier is displaceable by a shifting fork or a linear motor directly connected to the spindle gear carrier.

13. A vehicle transmission comprising the differential gear arrangement according to claim 1.

14. A vehicle having an all-wheel drive (AWD) function, comprising a wheel axle provided with the differential gear arrangement according to claim 1.

* * * * *